United States Patent
Favarcq et al.

(10) Patent No.: US 10,452,507 B2
(45) Date of Patent: Oct. 22, 2019

(54) BENCH AND SOFTWARE FOR TESTING ELECTRICAL EQUIPMENT, IN PARTICULAR A COMPUTER

(71) Applicant: SPHEREA TEST & SERVICES, Colomiers (FR)

(72) Inventors: Nicolas Louis Favarcq, Toulouse (FR); Jean-Yves Gilbert Guy, Colomiers (FR); Guillaume Christophe Frederic Robin, La Salvetat Saint Gilles (FR)

(73) Assignee: SPHEREA TEST & SERVICES, Colomiers (FR)

( * ) Notice: Subject to any disclaimer, the term of this patent is extended or adjusted under 35 U.S.C. 154(b) by 44 days.

(21) Appl. No.: 15/522,363

(22) PCT Filed: Oct. 27, 2015

(86) PCT No.: PCT/FR2015/052894
§ 371 (c)(1),
(2) Date: Apr. 27, 2017

(87) PCT Pub. No.: WO2016/066950
PCT Pub. Date: May 6, 2016

(65) Prior Publication Data
US 2017/0322857 A1    Nov. 9, 2017

(30) Foreign Application Priority Data

Oct. 30, 2014 (FR) .................................... 14 60434

(51) Int. Cl.
*G06F 11/00* (2006.01)
*G06F 11/273* (2006.01)
*G06F 11/263* (2006.01)

(52) U.S. Cl.
CPC ........ *G06F 11/2733* (2013.01); *G06F 11/263* (2013.01)

(58) Field of Classification Search
CPC .......................... G06F 11/263; G06F 11/2733
See application file for complete search history.

(56) References Cited

U.S. PATENT DOCUMENTS

| | | | |
|---|---|---|---|
| 7,458,043 B1 * | 11/2008 | Cischke | G01R 31/318357 703/22 |
| 2003/0115009 A1 * | 6/2003 | Ho | G06F 11/263 702/119 |
| 2003/0216891 A1 * | 11/2003 | Wegener | G06F 11/2294 702/188 |
| 2004/0153860 A1 * | 8/2004 | Whetsel | G01R 31/31855 714/43 |
| 2005/0024041 A1 | 2/2005 | West | |
| 2005/0154551 A1 * | 7/2005 | Pramanick | G01R 31/3183 702/119 |

(Continued)

OTHER PUBLICATIONS

International Search Report, dated Apr. 3, 2016, from corresponding PCT application.

*Primary Examiner* — Joshua P Lottich
(74) *Attorney, Agent, or Firm* — Young & Thompson

(57) ABSTRACT

Disclosed is a test bench (1) for testing equipment (2), in particular a computer. The test bench includes: at least one programmable macro-instrument (12), a set of measurement and generation instruments (14), and a set of charges (15), switchable with one another. Also disclosed is a computer program for using such a bench (1).

9 Claims, 5 Drawing Sheets

(56) References Cited

U.S. PATENT DOCUMENTS

| | | | |
|---|---|---|---|
| 2010/0161306 A1* | 6/2010 | Burgun | G01R 31/3183 703/20 |
| 2013/0110446 A1 | 5/2013 | Bourassa et al. | |
| 2014/0095931 A1* | 4/2014 | Sadasivam | G06F 11/3664 714/28 |
| 2014/0143600 A1* | 5/2014 | Hutner | G06F 11/263 714/35 |
| 2015/0301108 A1* | 10/2015 | Hamid | G01R 31/3177 714/724 |

* cited by examiner

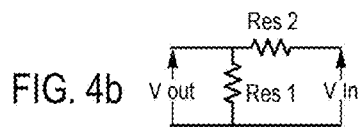
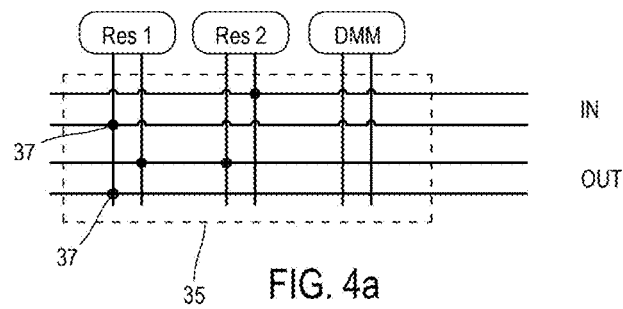
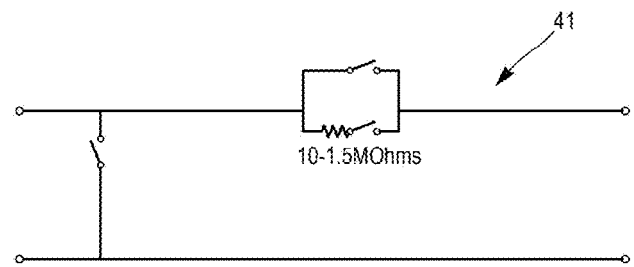
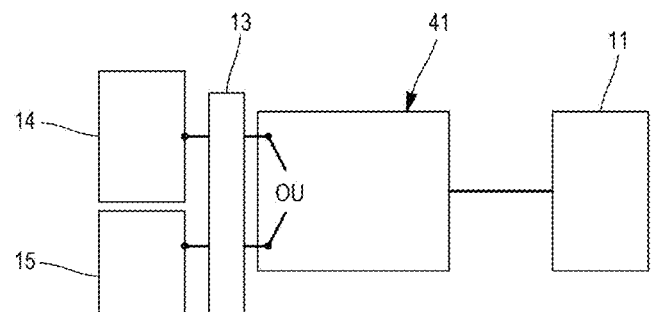

BENCH AND SOFTWARE FOR TESTING ELECTRICAL EQUIPMENT, IN PARTICULAR A COMPUTER

BACKGROUND OF THE INVENTION

Field of the Invention

This invention relates to a test bench for electrical and electronic equipment, in particular computers, in particular intended for aeronautics.

During the development of such equipment, tests are provided intended to verify the proper operation thereof, before this equipment is implemented on vehicles, in particular on aircraft, in order to minimise, and preferably suppress, the risks of malfunction which could be fatal in an operational situation.

Description of the Related Art

Such benches exist, which are adapted, each one, to a given piece of equipment or to a given type of equipment. A bench generally comprises a set of relays and multiplexers configured to connected therein a piece of equipment and to connect it to test instruments, generally "off the shelf" instruments, i.e. available in the market and/or interchangeable between two benches. These test instruments can be of the ampere meter, voltmeter, ohmmeter, function generator type, without being limited to this list.

Such benches do not allow for a simple modification of a test program. They are also not suited for a modification of the structure of a piece of equipment in the process of development, of adjustment or during an update during development, during adjustment or during an updating and when testing several different pieces of equipment. They require a specific design adaptation to be developed for each piece of equipment.

BRIEF SUMMARY OF THE INVENTION

The invention has for purpose to propose a bench:
making it possible to simplify development, adjustment and modification of test programs;
that enables high rates of production to be maintained by increasing the productivity of the bench, by reducing test time and/or by having a capacity to test several computers at the same time; and,
of which the hardware and software architecture is designed to maximise the rate of availability of the bench by taking the aspects of reliability and of maintenance of the latter into account.

In order to achieve its purpose, the invention proposes a bench for testing equipment, in particular a computer, that comprises:
at least one programmable macro-instrument;
a set of measurement and generation instruments;
a set of charges;
means for switching signals exchanged between said equipment and said macro-instrument; and,
means for switching signals exchanged between said sets of measurement and generation instruments, the charges and said macro-instrument.

Another object of the invention is a computer program for the implementing of a test bench according to the invention, characterised in that it comprises at least one step for setting the parameters of the configuration of the macro-instrument.

BRIEF DESCRIPTION OF THE DRAWINGS

Other characteristics and advantages of the invention shall appear when reading the detailed description of several embodiments of the invention given as non-limiting examples, in reference to the annexed drawings wherein:

FIG. 4a shows a configuration of the macro-instrument of FIG. 3;

FIG. 4b shows the electrical diagram that corresponds to the configuration of FIG. 4a;

FIG. 5 is a functional diagram of another macro-instrument used in the bench of FIG. 1;

FIG. 6 shows connections of the macro-instrument of FIG. 5;

DETAILED DESCRIPTION OF THE PREFERRED EMBODIMENTS

Figure 1:
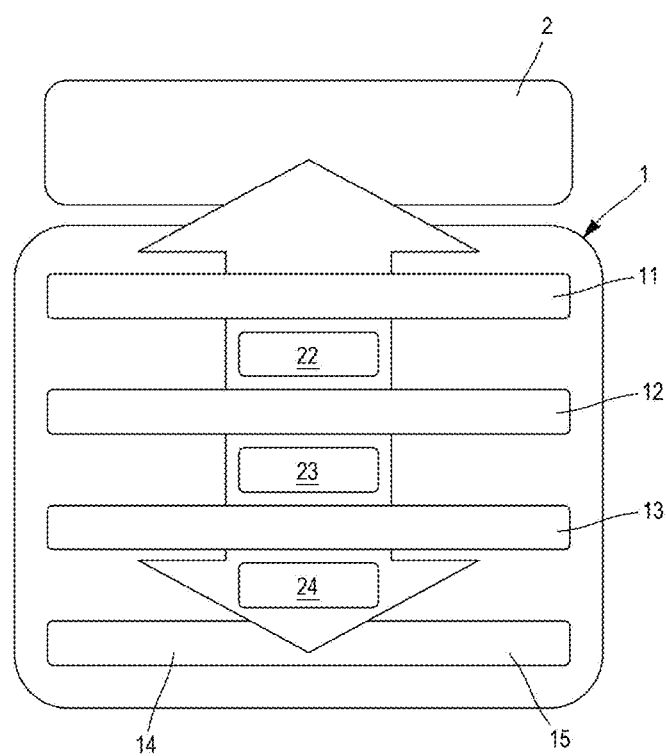
FIG. 1 diagrammatically shows a bench according to the invention in its environment.

FIG. 1 shows a test bench 1, provided to test a computer 2. The bench 1 comprises:
first switching means 11 provided to switch signals coming from or going to the computer;
macro-instruments 12, i.e. elements that make it possible to adapt the various signals inside the bench;
second switching means 13 provided to switch signals coming from macro-instruments and going to test instruments, or, coming from generation instruments and going to macro-instruments; and,
measurement and generation instruments 14 and/or charges 15.

The bench further comprises:
an external interface 21, which makes it possible to connect the computer 2 to the first switching means 11; i.e. which makes it possible to connect the computer to the bench 1;
a first internal bus 22, that connects the first switching means 11 with the macro-instruments;
a second internal bus 23, that connects the macro-instruments 12 with the second switching means 13; and,
an instrumentation and charges interface 24, provided to connect the second switching means with the measurement generation instruments 14 and/or with a set of charges 15, i.e. an interface that makes it possible to connect the measurement and generation instruments, as well as a set of charges, in the bench 1.

The bench is suited to allow for the circulation of signals from the tested equipment, here the computer 2, and/or to this equipment.

The switching means 11, 13 perform the function of an abstraction layer. The first switching means 11 make it possible to overcome the number of channels that the computer 1 has. The second switching means 13 insulate the measurement instrument/generation instrument portion which as such can be made to change without impact on the macro-instruments 12.

Such an architecture makes it possible to modify elements of the test system 1, 2, for example the computer to be tested, the macro-instruments, the measurement instruments or the generation instruments, with a minimum impact on the whole of this system.

The measurement instruments can be in particular a digital multimeter (DMM) or a digital storage oscilloscope (DSO).

The interfaces 21, 24 are defined to allow for the interconnection of the various hardware components and to make it possible to size the means of switching.

The external interface 21 is provided to connect the bench 1 to one or several computers. It is provided with differential pairs that can be broken down into an equipment signal pair, pair of programmable connections (PINPROG) and pairs of static charges. It is also possible to supplement the interface with specific interface means; for example, pressure, optic fibre, very high power.

The first internal bus 22 allows the adaptations supported by the macro-instruments to be connected to the connection points of the equipment being tested. This does not concern configurations referred to as "static" or numerical. Its size determines the number of different points that can be connected simultaneously to the macro-instruments 12

The second internal bus 23 makes it possible to connect the second switching means 13 for the instruments 14 to the various macro-instruments 12.

This bus is comprised of:
pairs of measurements;
pairs of generation;
pairs of measurement or generation;
pairs of generation and sensors for insulation tests.

The instrumentation interface 24 is a bus that makes it possible to connect the different instruments 14, as well as the charges 15, to the second means of switching. This bus is advantageously extensible and makes it possible to adapt to different configurations of the bench 1.

The first switching means 11 comprise a signal selector comprised of two-wire multiplexers making it possible to switch from input/output pairs of the computer 2, of which the number is advantageously extendable, to pairs forming the first internal bus 22.

The second switching means 13 comprise a first selector, referred to as instrument selector. The instrument sector makes it possible to connect measuring instruments on these input/output points of the macro-instruments, via the second internal bus 23. It advantageously comprises a communication matrix that connects the instruments 14 with the second internal bus 23. This matrix comprises, on the instrument side, pairs that each form an input/output point of an instrument, and, on the internal bus side 23, measurement pairs.

The second switching means 13 further comprise a second selector, referred to as resource selector. The resource selector makes it possible to connect generation instruments on input/output points of the macro-instruments, via the second internal bus 23. It advantageously comprises a communication matrix that connects the generation instruments 15 with the second internal bus 23. This matrix comprises, on the generation instrument side, pairs that each constitute an input/output point of a generation instrument, and, on the internal bus side 23, generation pairs.

A support for dynamic signals is carried by a structure that forms a rack called "SD rack". The latter forms an immutable core of the bench 1. It comprises:
a mechanical portion which makes it possible to place it in a standard rack, for example with 19-inch format;
a power supply rack, to power the active elements of the rack;
a passive circuit board (PCB), referred to as "SD backplane" which receives the various functionalities of it; and,
a chaining connector, which makes it possible to extend the size of the various functionalities.

The bench 1 has a safety system that makes it possible to deactivate the outputs and as such prevent any electrical risk for the user. An all-or-nothing signal is provided in the rack SD, on all of the connectors 32, in order to allow a so-called "smart" element to process an operation associated with the disconnection or with the absence of connection to equipment to be tested.

Figure 2:
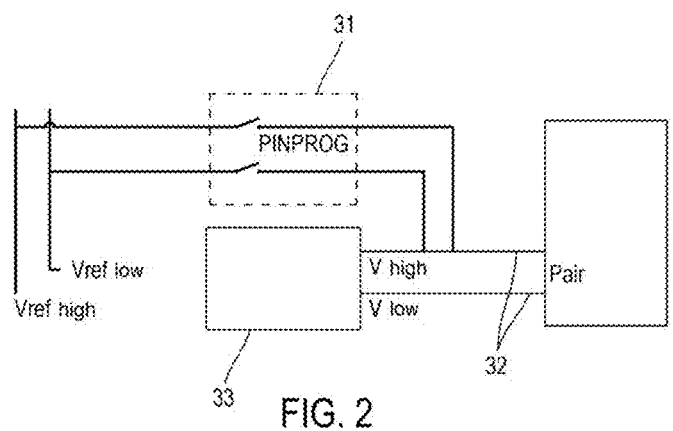
FIG. 2 diagrammatically shows the switching means used in the bench of FIG. 1.

The bench 1 comprises a signal distribution functionality shown in FIG. 2. This signal distribution function makes it possible to avoid wiring between the channel of the bottom of the SD backplane, the first switching means and the pair of connectors considered. The goal of this switching is primarily to direct an "equipment" signal to one of the pairs available on the internal bus of the bench 1. The signal distribution function makes it possible to set the state of a channel regardless of the test and the equipment being tested.

A macro-instrument makes it possible to adapt the various signals inside the bench, instead of a specific interface, such as was provided and used in benches in prior art. Macro-instruments shall now be described in reference to FIGS. 3, 4a, 4b, 5 and 6.

Figure 3:
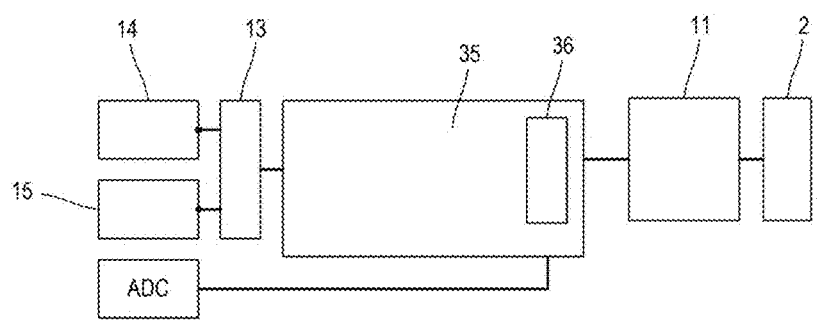
FIG. 3 shows connections of a macro-instrument used in the bench of FIG. 1.

FIG. 3 shows an electric network generator 35. This generator 35 responds to a need of flexibility that is required for the passing of unit tests.

The electric network generator 35 allows for the configuring of a single channel via the dynamic creation of more or less complex electrical diagrams, which makes it possible to overcome a specific wiring inside the bench 1. It can be configured, in order to allow the user to select the network pattern to be applied between the instruments 14, the charges 15 and the input/output points of the computer 2. Furthermore, it allows for the reorganisation of the wires that exit in a non-ordered manner from the instrument selector in pairs. It includes a switching stage 36 which makes it possible to select wires coming from the switching means 11.

FIG. 4a shows an example of an implementation for the macro-instrument of FIG. 3. As shown in FIG. 4a, such a macro-instrument can comprise two input lines (IN) and two output lines (OUT), represented horizontally. It further comprises pairs of lines for two resistors res1, res2 and for a digital multimeter DMM; these lines are represented vertically and form a matrix of connections with the input IN and output OUT lines. These connections can be open or closed, according to the wiring pattern that is sought and/or according to the measurement that is to be taken.

In the configuration shown in FIG. 4a, the closed connections are represented by a point 37; this configuration is compliant with the electrical diagram of FIG. 4b.

FIGS. 5 and 6 show an example of a macro-instrument 41 of the "multi" type. This macro-instrument responds to a need for parallelism for testing several simultaneous channels. It allows for testing several channels simultaneously by placing a resistor in parallel or in series and by allowing for the generation of voltages on its terminals. The multi macro-instrument can be configured in order to allow the user to select the series or parallel resistors to be applied simultaneously between the instruments 14 and the input/output points of the computer 2. Such a macro-instrument can be used for crosstalk tests.

FIG. 6 shows the general configuration of such a macro-instrument 41.

The macro-instrument 41 is provided so that the set of wires coming from the internal buses 22, 23 can be connected therein. Each pair coming from a bus can be connected to the ground, or to a voltage generated by the bus coming from generation instruments 14, and can be short circuited.

Another type of macro-instrument, not shown, is of the "digital bus" type. It allows for communication with the software internal to the computer, when it exists, for the management of tests. This functionality requires a permanent connection with the computer 2, all throughout the test.

The digital bus makes it possible to perform a functional test of one or several channels. This requires a certain number of channels in parallel; means for switching these channels are advantageously provided in order to minimise costs.

The "digital bus" macro-instrument is modular; it makes it possible to size a bench according to need, by making it possible to differentiate the needs for simultaneity and access to the channels.

Another type of macro-instrument is of the "power supply" type. It allows power supplies to be distributed according to need, for example 28V or 115V at 400 Hz. It is configured to conduct tests such as brownouts.

Figure 7:
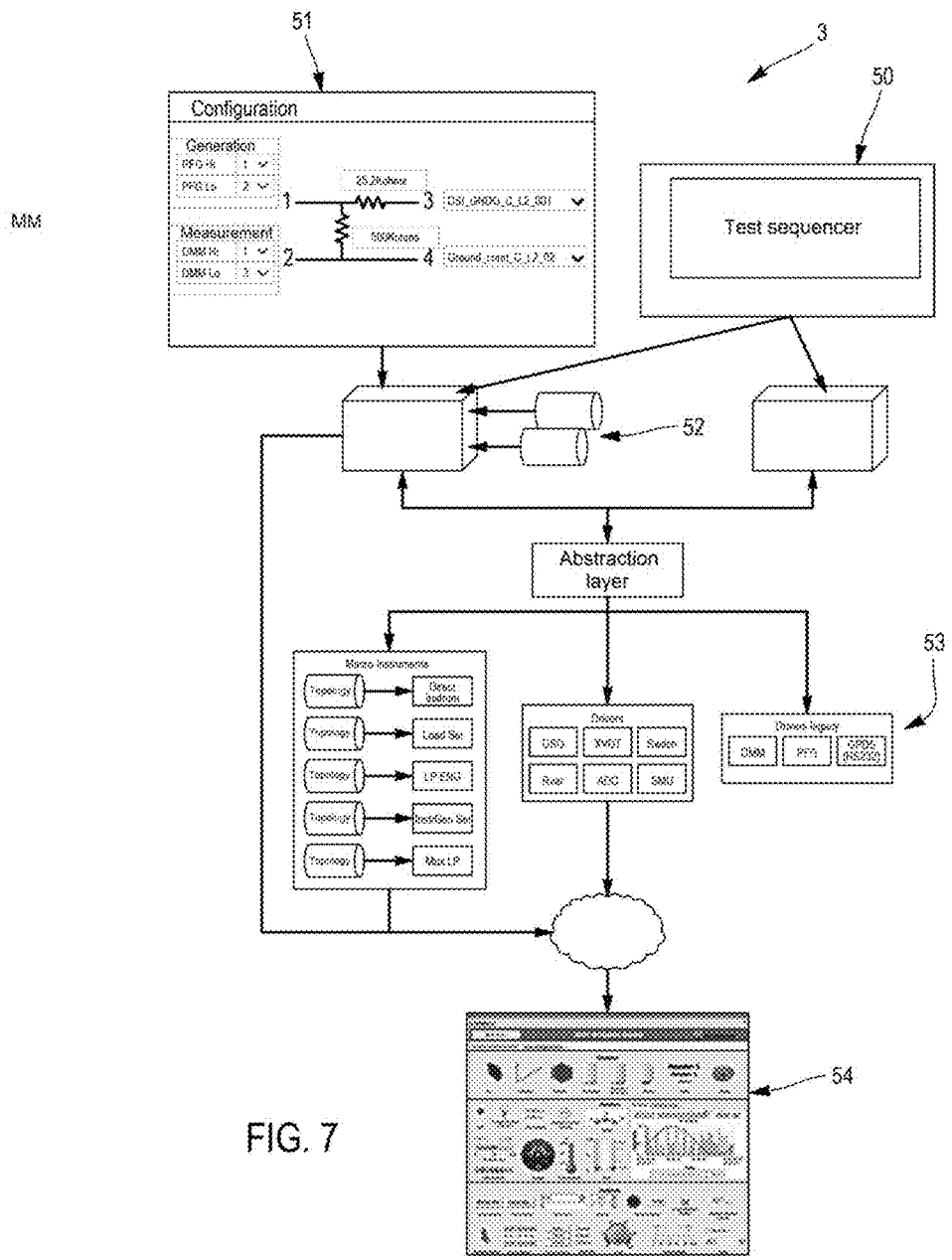
FIG. 7 shows a software method used for the implementing of the bench of FIG. 1.

FIGS. 7 to 10 describe a software method for implementing the bench 1. FIG. 7 is a flowchart that particularly shows the architecture of this software 3.

It comprises:
a prior step 50 of configuring tests;
a prior step 51 of setting the parameters for configurations of macro-instruments;
a prior step 52 of configuring connections;
a step 53 of configuring measurement and generation instruments; and,
a step 54 of formatting data relating to the test considered.

The step of configuring connections 52, comprises the supplying of a file, loaded by the software when it is launched; This files gives the correspondence between the signal names and the input/output pins of the external bus 21. Thanks to this file, the bench identifies the names of the signals of the computer 2, not simple pin or relay numbers.

The software 3 allows for two levels of functionality. A first level of configuration of the macro-instruments, then a second level of creating test steps of a higher level. The test steps shall therefore be comprised of configurations of macro-instruments, of measurement instruments and generation instruments. This approach makes it possible to provide the developer with sufficient freedom, and makes it possible to quickly create test steps for a set of channels.

Figure 8:
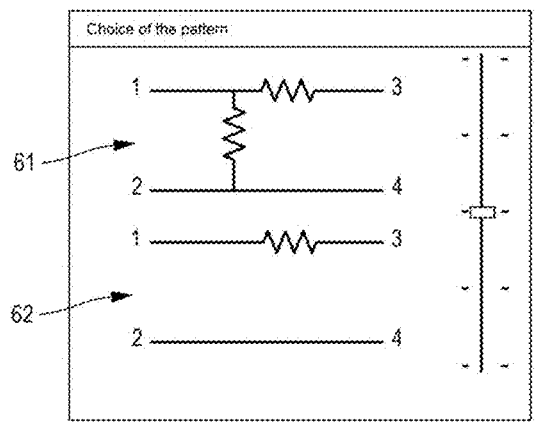
FIGS. 8 to 10, show the steps of the method of FIG. 7.
Figure 9:
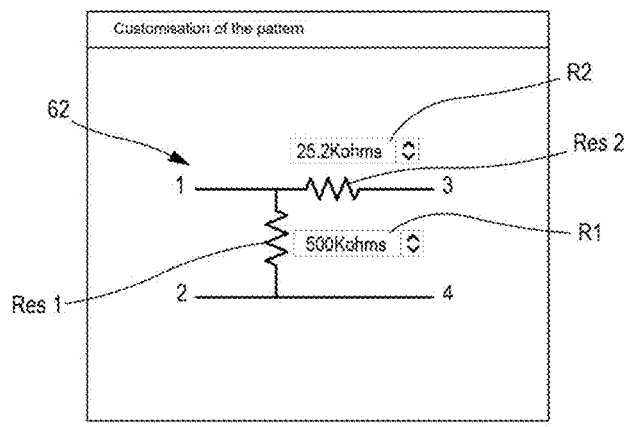
Figure 10:
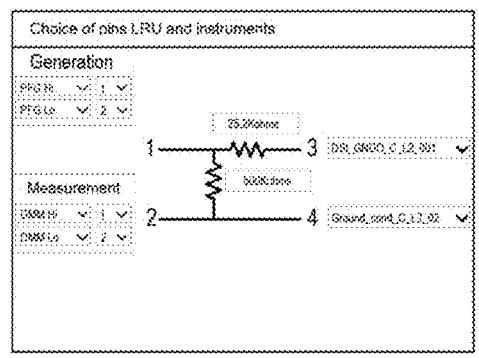

FIGS. 8 to 10 show an example of a configuration 51 of an electric network generator 35 macro-instrument.

As shown in FIG. 8, an electrical diagram is first selected, from the diagrams that can be carried out by this macro-instrument. In this example, two diagrams 61, 62 are possible.

As shown in FIG. 9, the diagram 61 is chosen; it comprises two resistors Res1, Res2. The respective values R1, R2 of the resistors Res1, Res2 are then chosen.

Then, as shown in FIG. 10, a potential applied to each line is chosen and a type of measurement to be carried out between two chosen points (point 1, point 3) of the diagram.

In automatic mode, the pins LRU can be selected via a list. The generation/acquisition points can be modified, the software handles the routing of the points.

The test steps are generally comprised of operations to be applied to a set of points. The bench 1 incorporates an interface for this that makes it possible to describe a test in step 50, and to apply it to a set of points.

A routing is managed automatically at the time of selection, on a macro-instrument, by a user of the bench, of a signal emitted by the computer.

Commands are passed at the level of the macro-instrument; each macro-instrument is controlled by a driver that handles the use of the measurement instruments and their routing over the various macro-instruments. The macro-instruments therefore manage an access mutex (mutual exclusion) that they activate before any command to an instrument and that they release after each measurement.

The bench memorises the routes used on the second internal bus, dedicated to the macro-instruments, in order to prevent simultaneous usage. This mechanism makes it possible to be able to conduct a crosstalk test with a macro-instrument of the multi type 41, and, simultaneously a test of unit channels on an electric network generator 35 or of power on the Multi. In order to allow for the programming of this simultaneity, the software is divided into test blocks by macro-instruments. These test blocks are preferably referenced via test chapters.

Of course, the invention is not limited to the preferred embodiments that have just been described, but on the contrary the invention is defined by the claims that follow.

It will indeed appear to those skilled in the art that various modifications can be made to the embodiments described hereinabove, in light of the information that has just been disclosed to them.

The invention claimed is:

1. A test bench (1) for equipment (2), including a computer, the test bench comprising:
    an external interface that connects the equipment being tested;
    a macro-instrument (12) that adapts signals within the test bench, the macro-instrument (12) being programmable;
    a set of measurement and generation instruments (14);
    a set of charges (15), each charge being a load on the equipment being tested;
    a first switch (11) that connects, via the external interface, to the equipment being tested to switch signals coming from or going to the equipment, to thereby exchange signals between said equipment (2) and said macro-instrument (12);
    a first internal bus (22) connected to the first switch (11) and the macro-instrument (12);
    a second internal bus (23) connected to the macro-instrument (12); and
    a second switch (13) connected to the second internal bus (23) and to the set of measurement and generation instruments (14), the charges (15), and the macro-instrument (12), the second switch (13) for switching signals exchanged between said set of measurement and generation instruments (14), the set of charges (15), and said macro-instrument (12), the second switch (13) configurable to insulate the set of measurement and generation instruments (14) and the set of charges (15) from the macro-instrument (12), wherein via the external interface, the first switch, the first internal bus, the second internal bus, and the second switch, test signals are circulated between the equipment being tested and the set of measurement and generation instruments (14) and the set of charges (15) without impact on the macro-instrument (12).

2. The test bench according to claim 1, wherein the macro-instrument (12) comprises an electric network generator (35).

3. A nontransitory computer-readable medium on which is stored a program, which when executed by a computer, implements a test bench (1) for equipment (2) according to claim 2, wherein the program comprises at least one step (51) for setting the parameters of the configuration of the macro-instrument (12).

4. A nontransitory computer-readable medium on which is stored a program, which when executed by a computer, implements a test bench (1) for equipment (2) according to claim 1, wherein the program comprises at least one step (51) for setting the parameters of the configuration of the macro-instrument (12).

5. The nontransitory computer readable medium according to claim 4, wherein the program further comprises a step (52) of configuring connections which include the supplying of a file that provides a correspondence between names of signals and input/output pins to which said equipment (2) is connected.

6. The test bench according to claim 1, further comprising:
a second internal bus (23) connected to the macro-instruments (12) with the second switch (13); and
an instrumentation and charges interface (24), connecting the second switch (13) with the measurement generation instruments (14) and with the charges (15).

7. The test bench according to claim 1, wherein,
the macro-instrument (12) comprises an electric network generator (35),
said set of measurement and generation instruments (14) includes a digital multimeter (DMM) or a digital storage oscilloscope (DSO), and
the first switch comprises two-wire multiplexers, and further comprising:
a second internal bus (23) connected to the macro-instruments (12) with the second switch (13); and
an instrumentation and charges interface (24), connecting the second switch (13) with the measurement generation instruments (14) and with the charges 15, and
wherein the second switch comprises i) an instrument selector arranged to connect measuring instruments, of said set of measurement and generation instruments (14), to input/output points of the macro-instrument (12), via the second internal bus (23), and ii) a second resource selector arranged to connect generation instruments of said set of measurement and generation instruments (14), to input/output points of the macro-instrument, via the second internal bus (23).

8. The test bench according to claim 1, wherein,
the macro-instrument (12) comprises a power supply providing plural power levels for brownout test, including 28V or 115V at 400 Hz.

9. The test bench according to claim 1, wherein, the external interface is connectable to the computer for testing the computer.

\* \* \* \* \*